United States Patent
Pocza

[11] Patent Number: 5,457,304
[45] Date of Patent: Oct. 10, 1995

[54] METHOD OF FORMING A DECORATIVE IMAGE ON FABRIC MATERIALS

[76] Inventor: Zoltan M. Pocza, P.O. Box 2231, Sherman, Tex. 75090

[21] Appl. No.: 263,367

[22] Filed: Jun. 20, 1994

[51] Int. Cl.[6] ........................................ H05B 6/62
[52] U.S. Cl. .................. 219/767; 219/777; 156/274.4; 156/380.8
[58] Field of Search ..................... 219/767, 765, 219/633, 777; 156/380.8, 273.7, 274.4

[56] References Cited

U.S. PATENT DOCUMENTS

| | | | |
|---|---|---|---|
| 2,621,138 | 12/1952 | Messing | 219/767 |
| 2,734,982 | 2/1956 | Gillespie et al. | 219/10.81 |
| 2,948,929 | 8/1960 | Stallard | 18/56 |
| 2,991,216 | 7/1961 | Hsu et al. | 219/767 |
| 3,053,960 | 9/1962 | Spieles | 219/10.53 |
| 3,596,035 | 7/1971 | Meenen | 219/767 |
| 3,791,906 | 2/1974 | Farkas | 156/245 |
| 3,884,742 | 5/1975 | Roberts | 156/268 |
| 3,993,529 | 11/1976 | Farkas | 156/380 |
| 4,246,461 | 1/1981 | Jeppson | 219/633 |
| 4,276,109 | 6/1981 | Siewert et al. | 219/767 |
| 4,352,709 | 10/1982 | Urai et al. | 219/633 |
| 4,482,417 | 11/1984 | Hulber et al. | 156/219 |
| 4,771,150 | 9/1988 | Kon | 219/767 |

*Primary Examiner*—Philip H. Leung
*Attorney, Agent, or Firm*—H. Dennis Kelly; Daniel Rubin; Timmons & Kelly

[57] ABSTRACT

A method of forming a raised image of preselected pattern onto the surface of a fabric material by first laminating a thin film of vinyl onto the surface of the fabric and underlying the fabric with a thin layer of vinyl. A heated die of the image to be formed is then caused to be impressed in a highly forced engagement against the laminated film, while RF energy is applied to the die platen for a controlled time period. The die and image are permitted to cool in place after which the die is removed and any extraneous vinyl particles permeated during the heated engagement can be easily brushed from the fabric surface while the image pattern remains.

10 Claims, 1 Drawing Sheet

METHOD OF FORMING A DECORATIVE IMAGE ON FABRIC MATERIALS

BACKGROUND OF THE INVENTION

1. Field of the Invention

This invention relates to a method of embossing a raised image of selected design onto fabric materials and the product formed by the method.

2. Description of the Prior Art

Vinyl materials used for upholstering and covering various items, such as handbags, purses, and attache cases, are commonly produced with a selected decorative image pattern on the surface. Forming the image pattern typically depends on the use of vinyl layers, separated by a batting composition and against which a heated image die can be imposed under pressure. Exemplifying this method is the disclosures of U.S. Pat. No. 2,734,982, issued Feb. 14, 1956, to Gillespie et al. While this method may be somewhat effective, the fabric product resulting from this method has thus far been limited to vinyl.

SUMMARY OF THE INVENTION

This invention relates to the forming of decorative raised images patterns on the surface of a variety of different fabric materials. More specifically, the invention relates to the method of forming embossed images on a variety of different fabrics and the products formed by this method.

The method of the invention involves: arranging a three layer composition comprised of a selected sheet of any suitable fabric material, such as polyester; laminating a thin vinyl film onto the fabric surface on which an image is to be formed; and backing the fabric with an underlying layer of expanded vinyl. After placing the composition as a unit in a support tray containing a bed of vulcanized fiber buffer material, a heated die of image configuration is impressed and maintained against the top surface of the composition for a controlled time period during which the laminated film is dissipated. On permitting the die to cool, the composition is removed, exposing the embossed image raised on the fabric surface.

The above, as well as additional objects features and advantages of the invention will become apparent in the following detailed description.

DESCRIPTION OF THE PREFERRED EMBODIMENT

Figure 1:
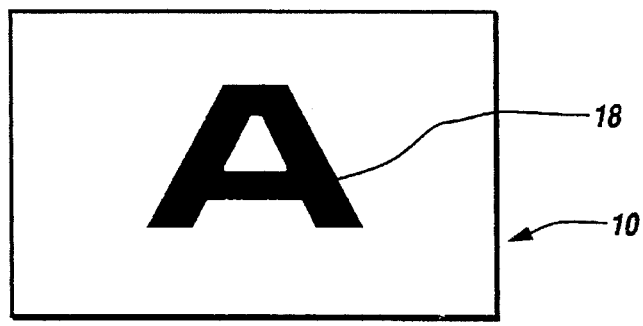
FIG. 1 is a plan view of a raised image pattern formed on a fabric in accordance with the invention.
Figure 2:
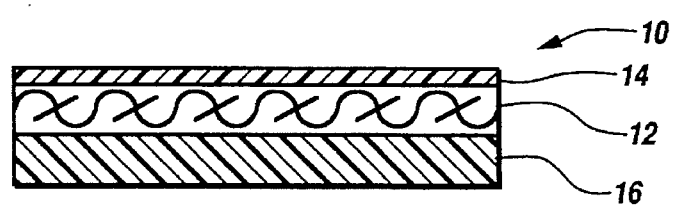
FIG. 2 is sectional view through the composition of materials on which the image of FIG. 1 is to be formed.

Referring now to the drawings, FIG. 2 illustrates an initially prepared three layer composition 10 and comprising a selected layer of fabric 12 on which a thin overlayer film of vinyl 14 has been laminated. Underlying the fabric unattached thereto is a layer of expanded vinyl 16. Essential in this relationship, as will be understood, is that fabric 12, onto which an image 18 is to be formed, comprises a composition to which a thin thermoplastic film 14 can be laminated.

Exemplifying fabric material 12 suitable for the above is 70 Denier nylon, 400 Denier nylon, 600 Denier polyester, and 1000 Denier cordura. Film 14 will typically be a vinyl film of at least 0.008 inches thickness, while underlayer 16 will typically be of an expanded vinyl composition of at least about 0.070 inches thickness.

To form an image 18, a die (not shown) is prepared as by engraving techniques, corresponding to the image 18. The die is then mounted onto a heatable platen (not shown) of an RF (radio frequency) or dielectric heat sealer 24 as manufactured, for example, by Hall Dielectric Machinery Co., Inc. of Deer Park, N.Y., as their model Series FS.

Figure 3:
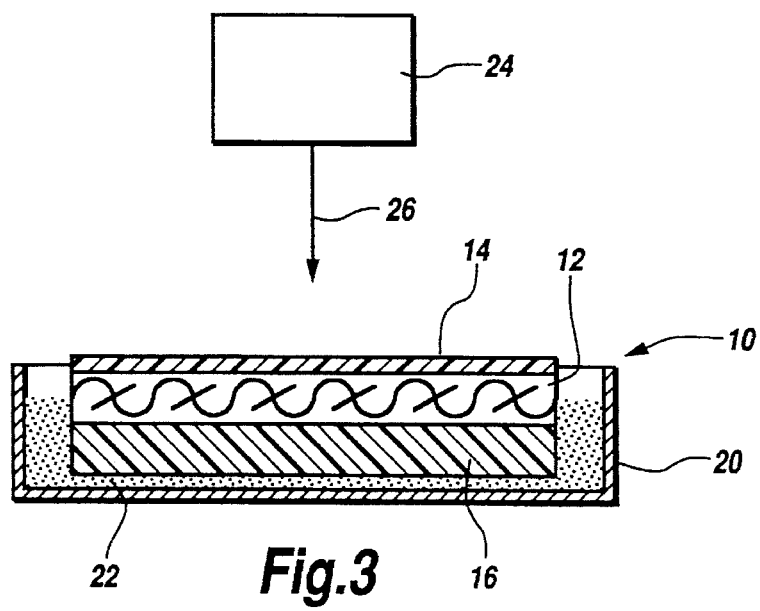
FIG. 3 illustrates the image forming step by which the raised image pattern of FIG. 1 is produced.

Positioned beneath a platen press of apparatus 24 is an aluminum tray 20 containing a thin layer of electrical grade vulcanized fiber 22, on which composition 10 is first placed, as illustrated in FIG. 3. The platen is preheated to about 150° F., and then the apparatus 24 is operated to cause its press to descend, as represented by arrow 26, until engaging its die against composition 10. Typically, the press will apply about a three ton force against composition 10.

With the die engaging the composition 10, the apparatus 24 is caused to effect a pre-seal for about 1 second, followed by an RF energizing for about three seconds. At that point, RF energy is removed from the platen, permitting a cooling cycle for about three seconds with the die still engaged. The press of apparatus 24 is then retracted, and the completed image 18 contained on fabric 12 is exposed. After image hardening occurs, there remains an embossed image 18, raised from the surface of fabric 12 and from which the originally laminated film 14 has been dissipated. What is seen by the naked eye is therefore an image bearing texture of pure fabric 12, part of which contains image 18.

During the sealing cycle, the vinyl film 14 and underlying vinyl layer 16 may stick together tending to pull the polyester fabric 12. This can cause an oozing or permeation of the vinyl molecules in transforming from a solid to a liquid and back to a solid during the cooling cycle. Any vinyl balls that may have permeated through the surface of the fabric by such oozing are then promptly removed by brushing.

The method of the invention is a novel method of forming embossed images on a variety of different fabrics and fabric products resulting from the method. By utilizing a novel composition of materials, carefully processed in a programed sequence, any selected image pattern can be readily reproduced onto a variety of different fabric materials. Once the fabric is thus formed, it can be utilized in a variety of different applications such as automobile upholstering, handbags, purses, and attache cases.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A method of forming a raised image of a preselected pattern onto a fabric surface, comprising the steps of:

selecting a fabric onto which an image is to be formed;

laminating a thin film of selected thermoplastic composition onto an upper surface of the fabric on which the image is to be formed;

placing a layer of selected thermoplastic composition underlying said fabric;

engaging a heated die of said image pattern impressed against the laminated film on said fabric;

maintaining the engagement between said die and said laminated film for a controlled time period sufficient to dissipate said laminated film and expose the fabric thereat; and permitting said die to cool before removing the die from said engagement.

2. A method in accordance with claim 1 in which both said film and said underlying layer are comprised of a vinyl composition.

3. A method in accordance with claim 2 in which said die is mounted on a heatable platen, said engaging step is preceded by the step of preheating said platen and there is included the step of applying RF energy to said platen for said controlled time period to effect said image formation.

4. A method in accordance with claim 3 in which during said engaging step said underlying layer is supported on a buffer composition.

5. A method in accordance with claim 4 in which said buffer composition comprises an electrical grade of vulcanized fiber.

6. A product formed by the method of claim 2.

7. A method in accordance with claim 1 in which said fabric is selected from the group consisting of nylon, polyester, or cordura.

8. A method in accordance with claim 1 in which said engaging step includes an application of a compression force against said film exceeding at least about two tons.

9. A method in accordance with claim 1 including an added step after said cooling step of removing any undesirable thermoplastic particles permeated onto the image surface of the fabric during said engaging step.

10. A product formed by the method of claim 1.

* * * * *